(12) United States Patent
Brückner et al.

(10) Patent No.: US 12,440,381 B2
(45) Date of Patent: Oct. 14, 2025

(54) EYE-SURGICAL TREATMENT APPARATUS

(71) Applicant: Carl Zeiss Meditec AG, Jena (DE)

(72) Inventors: Frank Brückner, Jena (DE); Wolf Weimer, Jena (DE); Andreas Weyhausen, Jena (DE); Mark Bischoff, Jena (DE); Gregor Stobrawa, Jena (DE)

(73) Assignee: Carl Zeiss Meditec AG, Jena (DE)

( * ) Notice: Subject to any disclaimer, the term of this patent is extended or adjusted under 35 U.S.C. 154(b) by 523 days.

(21) Appl. No.: 17/641,090

(22) PCT Filed: Sep. 8, 2020

(86) PCT No.: PCT/EP2020/075057
§ 371 (c)(1),
(2) Date: Mar. 7, 2022

(87) PCT Pub. No.: WO2021/048114
PCT Pub. Date: Mar. 18, 2021

(65) Prior Publication Data
US 2022/0339037 A1     Oct. 27, 2022

(30) Foreign Application Priority Data
Sep. 10, 2019   (DE) ................. 10 2019 213 737.7

(51) Int. Cl.
  *A61F 9/00*      (2006.01)
  *A61F 9/008*     (2006.01)
  *G16H 20/40*     (2018.01)

(52) U.S. Cl.
  CPC ......... *A61F 9/00827* (2013.01); *G16H 20/40* (2018.01); *A61F 2009/00872* (2013.01);
  (Continued)

(58) Field of Classification Search
  CPC ........ A61F 9/00827; A61F 2009/00872; A61F 2009/00878; A61F 2009/00897; A61F 2009/00873; G16H 20/40
  (Continued)

(56) References Cited

U.S. PATENT DOCUMENTS 9,084,666 B2 *   7/2015  Bischoff ............ A61F 9/00838
9,084,667 B2 *   7/2015  Bischoff ............ A61F 9/00804
(Continued)

FOREIGN PATENT DOCUMENTS

DE   102005040338 A1   3/2007
DE   102005049281 A1   4/2007
(Continued)

OTHER PUBLICATIONS

Material Properties Charts, Ferro-Ceramic Grinding Inc., p. 10 (Year: 2013).*
(Continued)

*Primary Examiner* — Eric D. Bertram
(74) *Attorney, Agent, or Firm* — DeWitt LLP

(57) ABSTRACT

A planning device that generates control data for a treatment apparatus which produces at least one cut surface in the cornea by application of a laser device. The invention further relates to a treatment apparatus having a planning device of the aforementioned type. The invention further relates to a method of generating control data for this treatment apparatus, and also to a method for eye surgery, at least one cut surface being produced in the cornea by application of a treatment apparatus with a laser device. The planning device has a calculation application that defines corneal cut surfaces, including a lenticule cut and a cap cut, the incision being controlled by the control data such that mutually
(Continued)

corresponding locations of the lenticule cut and cap cut are impinged by laser pulses during substantially the same time interval.

20 Claims, 7 Drawing Sheets

(52) U.S. Cl.
CPC ............... *A61F 2009/00878* (2013.01); *A61F 2009/00897* (2013.01)

(58) Field of Classification Search
USPC ............................................................. 606/5
See application file for complete search history.

(56) References Cited

U.S. PATENT DOCUMENTS

| | | | | |
|---|---|---|---|---|
| 11,602,457 | B2* | 3/2023 | Bischoff | A61F 9/00804 |
| 2008/0212623 | A1 | 9/2008 | Bischoff et al. | |
| 2008/0319428 | A1* | 12/2008 | Wiechmann | A61B 34/10 606/5 |
| 2011/0251601 | A1* | 10/2011 | Bissmann | A61F 9/00831 606/5 |
| 2011/0282333 | A1* | 11/2011 | Herekar | A61N 5/062 606/4 |
| 2012/0316545 | A1* | 12/2012 | Blumenkranz | A61F 9/00736 606/6 |
| 2013/0281992 | A1* | 10/2013 | Seiler | A61F 9/00827 606/5 |
| 2016/0089270 | A1* | 3/2016 | Fu | A61F 9/00825 606/5 |
| 2017/0266047 | A1* | 9/2017 | Kahra | A61F 9/00825 |
| 2019/0083308 | A1* | 3/2019 | Rathjen | A61F 9/00836 |
| 2019/0343683 | A1* | 11/2019 | Zheleznyak | A61F 9/00827 |
| 2020/0289318 | A1* | 9/2020 | Liu | A61F 9/00827 |
| 2020/0289320 | A1* | 9/2020 | Garcia | A61F 9/00827 |
| 2020/0315847 | A1* | 10/2020 | Rathjen | A61F 9/00827 |

FOREIGN PATENT DOCUMENTS

| | | | | |
|---|---|---|---|---|
| DE | 102006053117 | A1 * | 5/2008 | A61F 9/008 |
| DE | 102016218564 | A1 | 3/2017 | |
| EP | 3427707 | A1 | 1/2019 | |
| WO | WO 9629115 | A1 | 9/1996 | |

OTHER PUBLICATIONS

Davi et al., "A Comparative Study of Corneal Incisions, Induced by Pulsed Lasers at Infrared and Ultraviolet Wavelengths", Proc. SPIE 0605, Optical and Laser Technology in Medicine, (Aug. 5, 1986); https://doi.org/10.1117/12 (Year: 1986).*
Trento, "What are Beryllium's Properties?", 2024, Oceania International LLC, p. 1 (Year: 2024).*
International Preliminary Report on Patentability for PCT/EP2020/075057, mailed Mar. 24, 2022, 10 pages.
International Search Report for PCT/EP2020/075057, mailed Nov. 23, 2020, 5 pages.
English translation of International Search Report for PCT/EP2020/075057, mailed Nov. 23, 2020, 3 pages.

* cited by examiner

EYE-SURGICAL TREATMENT APPARATUS

RELATED APPLICATIONS

This application is a National Phase entry of PCT Application No. PCT/EP2020/075057 filed Sep. 8, 2020, which application claims the benefit of priority to DE Application No. 10 2019 213 98.2 filed Sep. 10, 2019, and DE Application No. 10 2019 213 737.7, filed Sep. 10, 2019, the entire disclosures of which are incorporated herein by reference.

TECHNICAL FIELD

The invention relates to a planning device for generating control data for a treatment apparatus which produces at least one cut surface in the cornea by application of a laser device. The invention further relates to a treatment apparatus having a planning device of the aforementioned type.

The invention further relates to a method for generating control data for a treatment apparatus which produces at least one cut surface in the cornea by application of a laser device.

The invention finally likewise relates to a method for eye surgery, at least one cut surface being produced in the cornea by application of a treatment apparatus with a laser device.

BACKGROUND

The prior art has disclosed very different treatment methods directed to correcting the refraction of the human eye. Here, example embodiments of the surgical methods modify the cornea in a targeted fashion in order thus to influence the refraction of light in the eye. A number of surgical methods are used to this end. The most widespread method is what is known as laser in-situ keratomileusis, which is also abbreviated LASIK. In the process, a corneal lamella is detached from the corneal surface on one side and folded to the side. This lamella can be detached by use of a mechanical microkeratome, or else by use of what is known as a femtosecond laser keratome, as distributed by Intralase Corp., Irvine, USA, for example. Once the lamella has been detached and folded to the side, the application of an excimer laser is provided in the LASIK operation, said laser removing the corneal tissue, exposed under the lamella in this way, by ablation. Once corneal tissue that was originally located under the corneal surface has been vaporized from the surface in this way, the corneal lamella is folded back again onto its original place.

The application of a laser keratome for exposing the lamella is advantageous over a mechanical blade since the geometric precision is improved and the frequency of clinically relevant complications is reduced. In particular, the lamella can be produced with a much more constant thickness if laser radiation is used. Additionally, the cut edge is shaped precisely, reducing the risk of healing disorders as a result of this interface which remains even after the operation. However, a disadvantage of this method is that two different treatment apparatuses have to be used, specifically firstly the laser keratome for exposing the lamella and secondly the laser that vaporizes the corneal tissue.

These disadvantages have been overcome in a method that was implemented by Carl Zeiss Meditec AG and that is known by the abbreviated name FLEX (Femtosecond Lenticule EXtraction). In this method for lenticule extraction, a cut geometry which separates a corneal volume (a so-called lenticule) in the cornea is formed in the cornea of the eye by application of a short pulse laser, for example a femtosecond laser. Said lenticule is then manually removed by the surgeon after the lamella (flap) that covers the lenticule has been folded to the side. An advantage of this method lies firstly in the fact that the cut quality is improved even further by the application of the femtosecond laser in combination with a curved contact glass.

Secondly, this only still requires one treatment apparatus; the excimer laser is no longer used. This method also avoids risks and limitations of the excimer laser.

A development of the FLEx method is currently referred to as SMILE method in the literature; no flap is produced here, rather only a small opening cut serves to provide access to the lenticule which is located under what is known as the cap. The separated lenticule is removed through this small opening cut, as a result of which the biomechanical integrity of the anterior cornea is impaired less than in the case of LASIK or similar methods. Moreover, fewer surface nerve fibers in the cornea are cut in this way, which probably has an advantageous effect on the reestablishment of the original sensitivity of the corneal surface. As a result, the symptom of dry eyes, which frequently has to be treated after LASIK, is reduced in its severity and duration. Other complications following LASIK, which are usually connected to the flap (e.g., flap displacement, folds, ingrowing epithelium in the flap bed), also occur less frequently without flap.

When generating cut surfaces in the cornea by application of laser radiation, the optical radiation effect is usually exploited by virtue of optical breakdown being generated by individual optical pulses, the duration of which may be between approximately 100 fs and 100 ns. It is also known to introduce individual pulses that have an energy below a threshold for optical breakdown into tissue or material in such overlaid fashion that material or tissue separation is also achieved therewith. This concept of producing cuts in the corneal tissue facilitates a great variety of cuts.

The optical radiation effect is usually positioned using so-called scanners, by application of which the pulses of the laser radiation are introduced into the tissue under 2-dimensional or 3-dimensional position control.

So-called plasma bubbles with diameters of the order of a few micrometers arise during the interaction of the laser pulses with the corneal material and usually disappear again into the surrounding tissue by way of absorption after a short time period, but these plasma bubbles may also combine and ultimately result in pressure being able to be exerted on the surrounding tissue, which pressure may lead to a change in position of tissue of the order of micrometers in the extreme case.

For correcting the refraction, patient-individual device parameters (typically sphere/cylinder/axis) are for example set on the basis of the diagnosis of the visual defect which should be corrected by the treatment.

To implement the envisaged cuts in the cornea, deterministic algorithms are implemented in the device by the device manufacturer on the basis of mathematical models, said algorithms effecting the necessary incision in the cornea such that the new corneal geometry arising once the lenticule has been removed corrects the determined visual defect.

It is possible that the change in position of the tissue caused by the bubble formation has a negative influence on the cut quality.

SUMMARY OF THE INVENTION

Embodiments of the invention specify a planning device for generating control data, a treatment apparatus for refraction-correcting eye surgery, and a method for generating control data for such a treatment apparatus, which facilitate an improved correction of the refraction.

According to example embodiments the invention, the invention includes a planning device of the type set forth at the outset, which has a calculation application for defining corneal cut surfaces, comprising a lenticule cut and a cap cut, the incision being controlled such that mutually corresponding locations of the lenticule cut and cap cut are impinged by laser pulses at substantially the same time interval. Here and below, mutually corresponding locations of the lenticule cut and cap cut are characterized in that they have substantially the same coordinate values in a coordinate system aligned on a plane perpendicular to the visual axis of the eye. In the case of a Cartesian coordinate system, these are substantially the same x- and y-coordinates, and in the case of a polar coordinate system, these are substantially the same radius and angle coordinates. What this achieves is that the cut effect is realized with a substantially constant time interval for the locations on the cornea which become adjacent as a result of the removal of the lenticule.

Surprisingly, the inventors have discovered that this type of incision may lead to better results than the method proposed previously in the prior art (EP 2364681) of cutting the posterior (lenticule) cut from out to in and subsequently the anterior (cap) cut from in to out. The incision described in EP 2364681 allows the transition from the lenticule cut to the cap cut to be implemented at the same radius, in this case radius=0, as a result of which a repositioning of the scanners is avoided and the time interval between completion of the lenticule cut and start of the cap cut is minimized.

In contrast thereto, the invention accepts that the scanners have to be returned to the initial radius during the transition from the lenticule cut to the cap cut.

So as not to have to accept an unwanted loss of time in the process, extremely fast scanners are used according to the invention, said scanners being characterized in that the scanner mirrors substantially consist of a material which has a specific stiffness phi of greater than $30 \times 10^6$ m$^2$ s$^{-2}$, for example greater than $50 \times 10^6$ m$^2$ s$^{-2}$, in another example greater than $100 \times 10^6$ m$^2$ s$^{-2}$ and in a further example greater than $150 \times 10^6$ m$^2$ s$^{-2}$. Here, the specific stiffness phi is defined as the quotient of Modulus of elasticity to density of the material.

Particularly suitable materials include inter alia:

Molybdenum phi=$32 \times 10^6$ m$^2$s$^{-2}$

Zirconium dioxide phi=$34.3 \times 10^6$ m$^2$s$^{-2}$

Silicon phi=$79 \times 10^6$ m$^2$ s$^{-2}$

Sapphire phi=$101 \times 10^6$ m$^2$ s$^{-2}$

Alumina phi=$103 \times 10^6$ m$^2$ s$^{-2}$

Silicon carbide phi=$140 \times 10^6$ m$^2$ s$^{-2}$

Beryllium phi=$155 \times 10^6$ m$^2$ s$^{-2}$

As a result, even in the case of extremely high deflection frequencies in the kHz range, the scanner mirrors do not bend so significantly that the intended optical effect is disturbed, but the force required to move the scanner mirrors remains small at the same time.

In the process, it is possible to scan and hence to cut both from in to out (increasing radius) and from out to in (decreasing radius).

For example, a cut speed (increase/reduction in the radius as a function of time) is greater than 0.6 mm/s, in another example greater than 0.8 mm/s, and in a further example greater than 1 mm/s. In conjunction with a laser that has an appropriate pulse frequency, it is then possible to cut a cap cut or lenticule cut with a diameter of, e.g., 3 mm in less than 5 seconds.

Example embodiments of the invention further include a treatment apparatus comprising a laser device which separates at least one cut surface in the cornea by application of laser radiation according to control data, and a planning device of the just aforementioned type for generating the control data, the incision being controlled such that mutually corresponding locations of the lenticule cut and cap cut are impinged by laser pulses at substantially the same time interval.

Further, according to the invention, the treatment apparatus may have fast scanners which are characterized in that the scanner mirrors substantially consist of a material which has a specific stiffness phi of greater than $30 \times 10^6$ m$^2$ s$^{-2}$, for example greater than $50 \times 10^6$ m$^2$ s$^{-2}$ in another example greater than $100 \times 10^6$ m$^2$ s$^{-2}$ and in a further example greater than $150 \times 10^6$ m$^2$ s$^{-2}$.

Example embodiments of the invention is likewise achieved by a method for generating control data of the type set forth at the outset, the method including: generating a control data record for the corneal cut surfaces for controlling the laser device, the incision being controlled such that mutually corresponding locations of the lenticule cut and cap cut are impinged by laser pulses at substantially the same time interval.

Another example embodiment of the invention includes a method comprising: generating a control data record for the corneal cut surfaces, transferring the control data to the treatment apparatus and producing the cut surfaces by controlling the laser device using the control data record, the incision being controlled such that mutually corresponding locations of the lenticule cut and cap cut are impinged by laser pulses at substantially the same time interval.

The invention therefore relates to an apparatus and a method which improve refractive surgery by virtue of the lenticule cut and cap cut being impinged by laser pulses at substantially the same time interval so that the cut effect is realized with a substantially constant time interval for the locations on the cornea which become adjacent as a result of the removal of the lenticule.

Here, the method according to the invention for defining cuts in the cornea for correcting the refraction is characterized by the following steps:

obtaining measurement data in terms of the correction, to be undertaken, of the refraction of the eye to be treated, calculating optimal cut geometries for cutting the cuts serving to correct the refraction, generating the control program for controlling the treatment apparatus on the basis of the calculated cut forms, the incision being controlled such that mutually corresponding locations of the lenticule cut and cap cut are impinged by laser pulses at substantially the same time interval.

Obtaining the measurement data in relation to the correction of the refraction to be undertaken is for example implemented by use of diagnostic devices in this case, for example using one or more from the group of keratometer system, wavefront analysis system, optical coherence tomography system, Placido disk-based topography system, Scheimpflug topography system, confocal topography system, low-coherence topography system.

In this context, it is irrelevant to the invention whether the values of the desired refraction correction are entered directly into the planning device or are transferred to the latter, or whether, on the basis of the desired refraction correction, geometric values for the lenticule to be cut, such as diameter, thickness, depth in the cornea, general shape data, etc., obtained values are entered into the planning device or are transferred to the latter.

It is understood that the features mentioned above and the features still to be explained below can be used not only in the specified combinations but also in other combinations or on their own without departing from the scope of the present invention.

BRIEF DESCRIPTION OF THE DRAWINGS

The invention is explained in even greater detail below for example with reference to the accompanying drawings, which also disclose features essential to the invention. In the figures.

DETAILED DESCRIPTION

Figure 1:
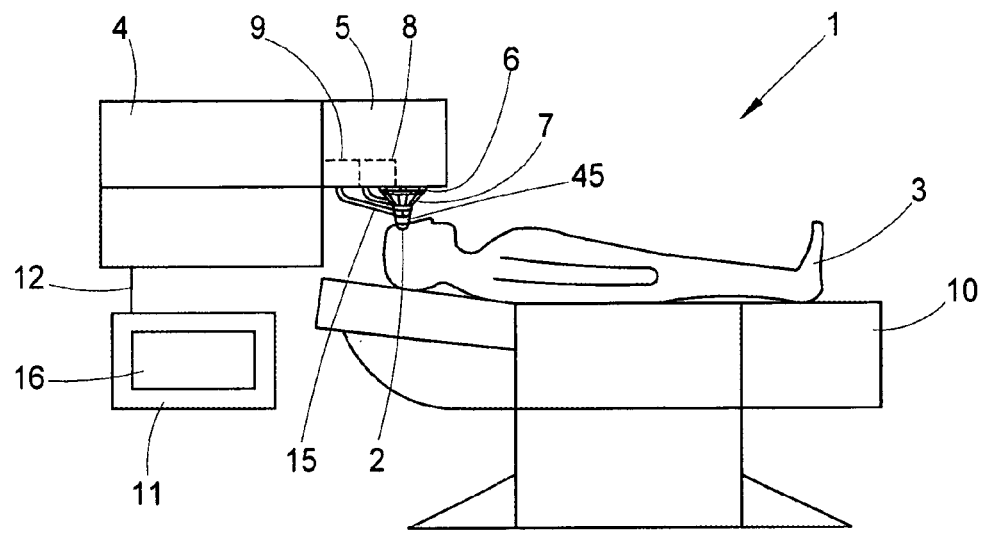
FIG. 1 is a schematic illustration of a treatment apparatus with a planning device for a treatment within the scope of an eye-surgical refraction correction.

A treatment apparatus for eye surgery is illustrated in FIG. 1 and provided with the general reference sign 1. The treatment apparatus 1 is designed to introduce laser cuts on an eye 2 of a patient 3. To this end, the treatment apparatus 1 comprises a laser device 4 which emits a laser beam 6 from a laser source 5, the laser beam being directed into the eye 2 or the cornea of the eye as a focused beam 7. For example, the laser beam 6 is a pulsed laser beam with a wavelength between 300 nanometers and 10 micrometers. Further, the pulse length of the laser beam 6 is in the range between 1 femtosecond and 100 nanoseconds, with pulse repetition rates of 500 kilohertz and 30 MHz, for example 1.2 to 10 MHz, and pulse energies between 1 nanojoule and 10 microjoules, for example 1 to 200 nanojoules, being possible. The treatment apparatus 1 thus generates a cut surface in the cornea of the eye 2 by deflecting the pulsed laser radiation. Therefore, a scanner 8 and a radiation intensity modulator 9 are additionally provided to this end in the laser device 4 or the laser source 5 thereof.

The patient 3 is situated on a bed 10, which is optionally adjustable in three spatial directions, in order to suitably align the eye 2 in relation to the incidence of the laser beam 6. In an example construction, the bed 10 is adjustable in motor-driven fashion. Alternatively, the patient bed is less movable and the treatment apparatus is appropriately adjustable in motor-driven fashion in return.

In particular, the control can be implemented by a controller 11 which, in principle, controls the operation of the treatment apparatus 1 and, to this end, is connected to the treatment apparatus by way of suitable data links, for example connection lines 12. Naturally, this communication can also be implemented in different ways, for example via light guides or by radio. The controller 11 makes the appropriate adjustments and controls the timing of the treatment apparatus 1, in particular the laser device 4, and hence brings about appropriate functions of the treatment apparatus 1.

The treatment apparatus 1 furthermore also has a fixation device 15, which fixates the relative position of the cornea of the eye 2 with respect to the laser device 4. This fixation device 15 may here comprise a known contact glass 45, to which the cornea of the eye is applied by negative pressure and which imparts a desired geometric shape on the cornea of the eye. Such contact glasses are known to a person skilled in the art from the prior art, for example from DE 102005040338 A1. The disclosure of this document, to the extent this relates to the description of a structure of the contact glass 45 that is suitable for the treatment apparatus 1, is completely incorporated herein.

Other modified or improved contact glass forms could also have advantages for the invention and are therefore intended to be incorporated.

The treatment apparatus 1 furthermore comprises a camera (not shown here), which is able to record an image of the cornea 17 of the eye through the contact glass 45. In this case, the lighting for the camera may be implemented both in the visible and in the infrared range of the light.

The controller 11 of the treatment apparatus 1 further also comprises a planning device 16, which will still be explained in more detail below.

Figure 2:
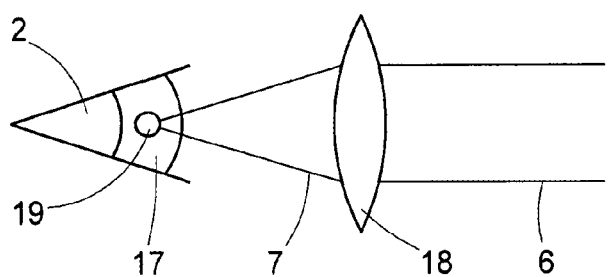
FIG. 2 is a schematic illustration of the effect of the laser radiation which is used in the treatment apparatus of FIG. 1.

FIG. 2 schematically shows the effect of the incident laser beam 6. The laser beam 6 is focused and is incident into the cornea 17 of the eye 2 as the focused laser beam 7. Schematically plotted optics 18 are provided for focusing purposes. They bring about a focus in the cornea 17, the laser radiation energy density being so high in said focus that, in combination with the pulse length of the pulsed laser radiation 6, a nonlinear effect occurs in the cornea 17. By way of example, each pulse of the pulsed laser radiation 6 can produce an optical breakdown in the cornea 17 of the eye in the focus 19, said breakdown, in turn, initiating a plasma bubble as indicated only schematically in FIG. 2. When the plasma bubble arises, the tissue layer separation comprises an area larger than the focus 19, even though the conditions for producing the optical breakdown are only obtained in the focus 19. So that an optical breakdown is produced by each laser pulse, the energy density, i.e., the fluence of the laser radiation, must lie above a certain, pulse-length-dependent threshold. A person skilled in the art is aware of this relationship, for example from DE 69500997 T2. Alternatively, a tissue-separating effect can also be achieved by pulsed laser radiation by virtue of a plurality of laser radiation pulses being emitted into a region, with the focal spots overlapping. Then, a plurality of laser radiation pulses interact in order to obtain a tissue-separating effect. The type of tissue separation used by the treatment apparatus 1 is of no further relevance to the description below, however; all that is essential is that a cut surface is produced in the cornea 17 of the eye 2.

In order to correct the refraction by eye surgery, a corneal volume is removed out of a region within the cornea 17 by application of the laser radiation 6 by virtue of tissue layers being separated there, said tissue layers isolating the corneal volume and then facilitating the removal thereof. To isolate the corneal volume to be removed, the position of the focus 19 of the focused laser radiation 7 in the cornea 17 is adjusted, e.g., in the case of the laser radiation introduced in pulsed form. This is shown schematically in FIG. 3. The refractive properties of the cornea 17 are modified in a targeted fashion by the removal of the volume in order thus to attain the correction of the refraction. Therefore, the volume is usually lens-shaped and is referred to as a lenticule.

Figure 3:
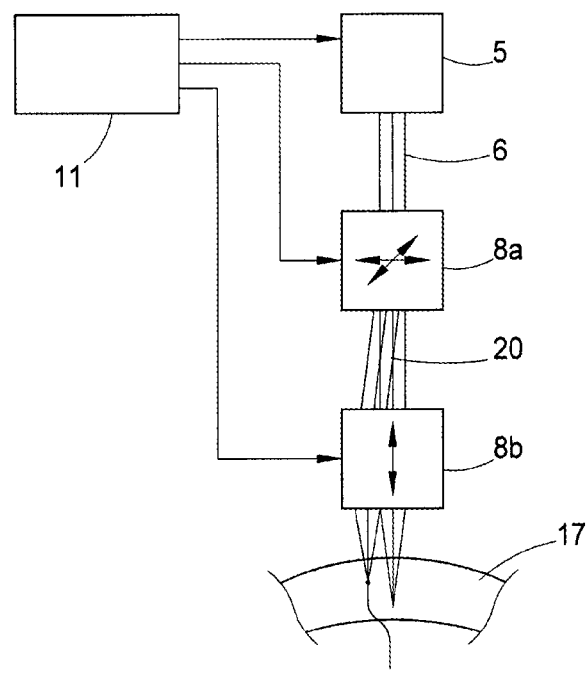
FIG. 3 is a further schematic illustration of the treatment device of FIG. 1, in relation to the introduction of the laser radiation.

FIG. 3 only plots the elements of the treatment apparatus 1 to the extent that these are necessary for understanding the cut surface production. As already mentioned, the laser beam 6 is focused into a focus 19 in the cornea 17 and the position of the focus 19 in the cornea is adjusted such that, for the purposes of producing cut surfaces, energy of laser radiation pulses, focused at different positions, is introduced into the tissue of the cornea 17. The laser radiation 6 is provided, for example as pulsed radiation, by the laser source 5. In the structure of FIG. 3, the scanner 8 has a two-part construction and consists of an xy-scanner 8a, which is realized in one variant by two galvanometer mirrors that deflect substantially orthogonally. The scanner 8a two-dimensionally deflects the laser beam 6 coming from the laser source 5 such that a deflected laser beam 20 is present downstream of the scanner 9. Consequently, the scanner 8a brings about an adjustment of the position of the focus 19 substantially perpendicular to the principal direction of incidence of the laser beam 6 in the cornea 17. In addition to the xy-scanner 8a, a z-scanner 8b is additionally provided in the scanner 8 for adjusting the depth position, said z-scanner being embodied as an adjustable telescope, for example. The z-scanner 8b ensures that the z-position of the position of the focus 19, i.e., the position thereof on the optical axis of incidence, is modified. The z-scanner 8b can be disposed upstream or downstream of the xy-scanner 8a.

For the principle of operation of the treatment apparatus 1, the assignment of the individual coordinates to the spatial directions is not essential, just as it is not essential that the scanner 8a deflects about mutually orthogonal axes. Rather, it is possible to use any scanner that is able to adjust the focus 19 in a plane not containing the axis of incidence of the optical radiation. Further, it is also possible to use any non-Cartesian coordinate system for the purposes of deflecting or controlling the position of the focus 19. Examples thereof include spherical coordinates or cylindrical coordinates.

The position of the focus 19 is controlled by operation of the scanners 8a, 8b which are controlled by the controller 11, the latter making appropriate adjustments to the laser source 5, the modulator 9 (which is not shown in FIG. 3) and the scanner 8. The controller 11 ensures a suitable operation of the laser source 5 and the three-dimensional focus adjustment, explained here in exemplary fashion, such that ultimately a cut surface is formed, the latter isolating a certain corneal volume that is intended to be removed for correcting the refraction.

The controller 11 operates according to predetermined control data which, for example in the case of the laser device 4 explained here purely in exemplary fashion, are specified as target points for the focal adjustment. As a rule, the control data are combined in a control data record. This yields geometric specifications for the cut surface to be formed, for example the coordinates of the target points as a pattern. Then, in this embodiment, the control data record also contains specific output values for the focal position adjustment mechanism, for example for the scanner 8.

Figure 4:
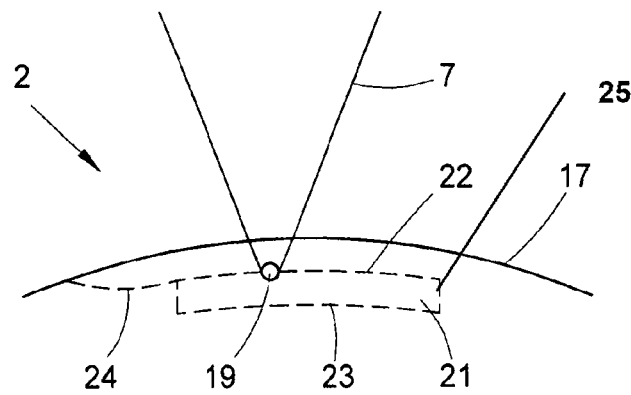
FIG. 4 is a schematic sectional illustration through the cornea of the eye for elucidating the removal of the corneal volume in the context of the eye-surgical refraction correction.

The production of the cut surface using the treatment apparatus 1 is shown in FIG. 4 in exemplary fashion. A corneal volume 21 in the cornea 17 is isolated by repositioning the focus 19, at which the focused beam 7 is focused. To this end, cut surfaces are formed, which are formed here as an anterior flap cut surface 22 and as a posterior lenticule cut surface 23 in exemplary fashion. These terms should be considered in purely exemplary fashion here and are intended to establish the relationship to the conventional LASIK or FLEX method, for which the treatment apparatus 1 is likewise designed, as already explained above. All that is essential here is that the cut surfaces 22 and 23 and the peripheral edge cut 25, which brings together the cut surfaces 22 and 23 at their edges, isolate the corneal volume 21. Further, a corneal lamella bounding the corneal volume 21 on the anterior side can be folded open by way of an opening cut 24 such that the corneal volume 21 is removable.

Alternatively, and essential to the present invention, it is possible to use the SMILE method, within the scope of which the corneal volume 21 is removed through a small opening cut, as described in DE 10 2007 019813 A1. The disclosure of this document is incorporated here in its entirety.

Figure 5:
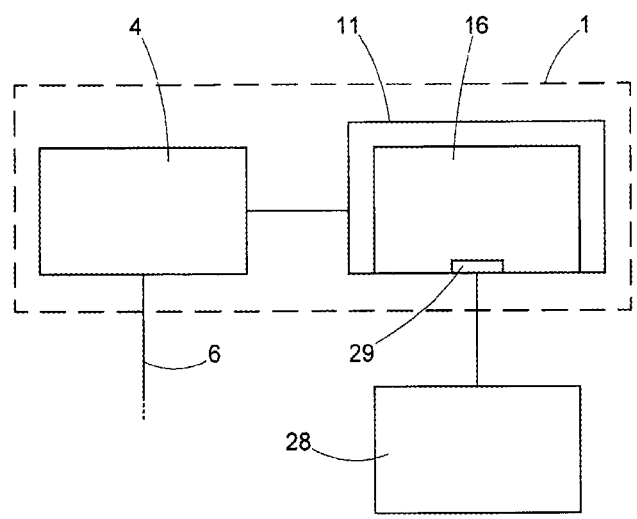
FIG. 5 is a schematic illustration in respect of the design of the treatment device of FIG. 1 with particular reference to the planning device present there.

FIG. 5 schematically shows the treatment apparatus 1, and the importance of the planning device 16 should be explained in more detail on the basis thereof. In this variant, the treatment apparatus 1 comprises at least two devices or modules. The laser device 4, already explained, emits the laser beam 6 onto the eye 2. As already explained, the operation of the laser device 4 is implemented fully automatically by way of the controller 11; that is to say, following an appropriate start signal, the laser device 4 starts the generation and deflection of the laser beam 6 and produces cut surfaces constructed in the described manner in the process. The laser device 4 receives the control signals required for the operation from the controller 11, which was provided with appropriate control data at an earlier time. This is implemented by application of the planning device 16, which is shown purely in exemplary fashion as a constituent part of the controller 11 in FIG. 5. Naturally, the planning device 16 can also have an independent embodiment and communicate with the controller 11 in wired or wireless fashion. All that is essential in that case is that an appropriate data transfer channel is provided between the planning device 16 and the controller 11.

The planning device 16 generates a control data record which is made available to the controller 11 for the purposes of carrying out the eye-surgical refraction correction. In this case, the planning device uses measurement data about the cornea of the eye. In the embodiment described here, these data originate from a measuring device 28 which had previously measured the eye 2 of the patient 3. Naturally, the measuring device 28 can be designed in any way and transmit the corresponding data to the interface 29 of the planning device 16.

The planning device 16 now supports the operator of the treatment apparatus 1 when defining the cut surface for isolating the corneal volume 21. This can go as far as fully automatically defining the cut surfaces, which may be implemented for example by way of the planning device 16 determining, from the measurement data, the corneal volume 21 to be removed, defining the boundaries of said corneal volume as cut surfaces and generating appropriate control data for the controller 11 therefrom. At the other end of the degree of automation, the planning device 16 may provide input options, at which a user enters the cut surfaces in the form of geometric parameters, etc. Intermediate levels provide suggestions for the cut surfaces that are generated automatically by the planning device 16 and then are modifiable by a user. In principle, all those concepts already explained above in the more general part of the description may be applied here in the planning device 16.

To carry out a treatment, the planning device 16 generates control data for producing the cut surfaces, the control data then being used in the treatment apparatus 1.

Figure 6A:
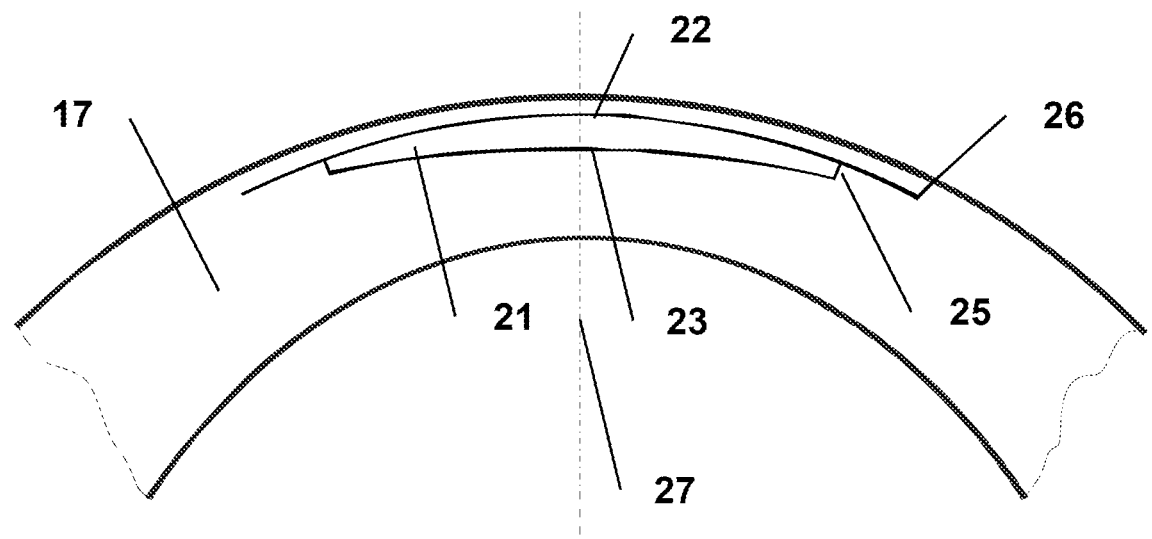
FIG. 6 is a schematic illustration of a cut geometry using the example of a SMILE procedure.

For clarification purposes, FIG. 6a shows a schematic illustration of a corneal cross section during the SMILE method. The cornea 17 has an anterior cap cut 22 with an opening cut 26. The posterior lenticule cut 23 isolates the lenticule volume 21 which can be removed through the opening cut 26. To this end, the lenticule 21 needs to initially be completely separated, by virtue of a spatula-type instrument mechanically separating tissue bridges for instance that still remain in the cap cut 22 and lenticule cut 23. Subsequently, the lenticule 21 is removed through the opening cut 26. The (imaginary) axis 27 represents the axis of symmetry of the cuts 22, 23, its point of intersection through the surface of the cornea 17 defining the centration of the cuts 22, 23, 25, 26.

Figure 6B:
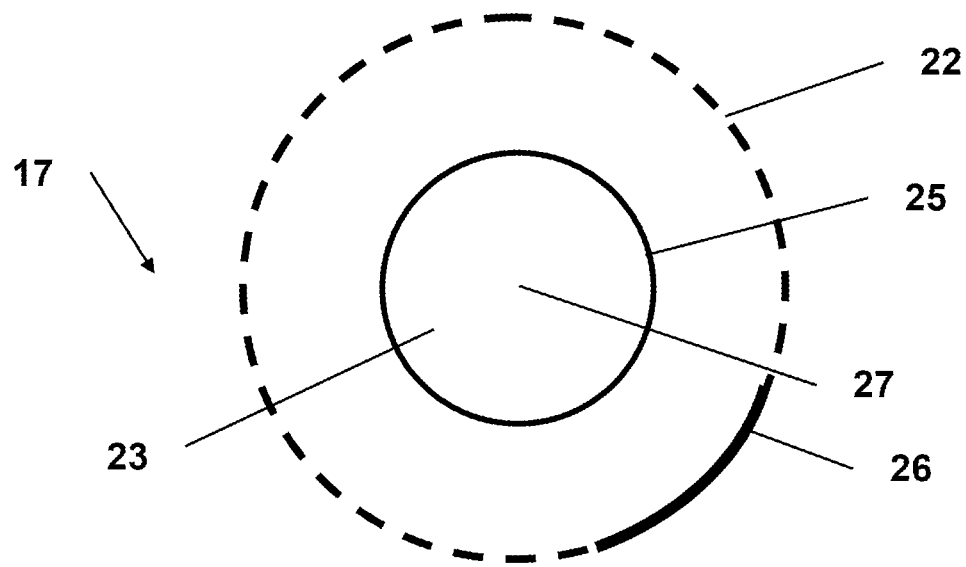

FIG. 6b shows a plan view of the cornea illustrated in FIG. 6a, the meaning of the reference signs here corresponding to that of FIG. 6a.

Figure 7A:
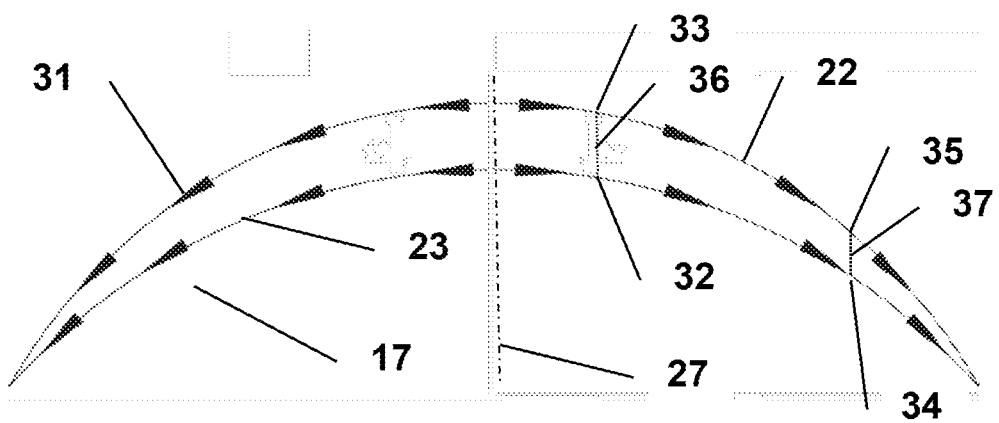
FIG. 7 is a schematic illustration of a cut profile according to the invention.
Figure 7B:
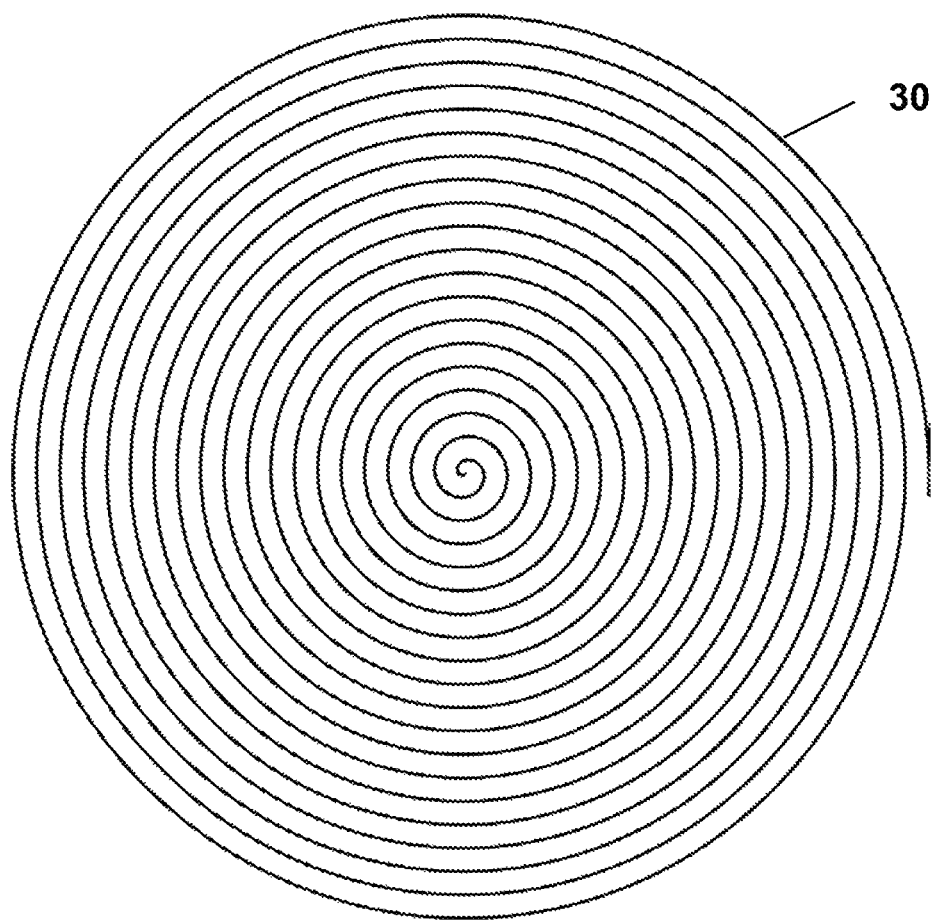

FIG. 7 schematically shows a cut profile according to the invention. FIG. 7a shows a (much-simplified) cross section through the cornea 17 in a manner analogous to FIG. 6a, FIG. 7b shows a much-simplified representation of the incision in the form of a spiral 30, in a manner analogous to FIG. 6b. As indicated by the arrows 31, lenticule cut 23 and cap cut 22 are cut in the same direction, from in to out in this case. In the temporal control of the cut procedure, it is ensured that mutually corresponding locations 32 and 33, or 34 and 35, which are overlaid in respect of respective (imaginary) connecting lines 36 and 37 parallel to the axis 27, are impinged by laser radiation, and hence cut, at substantially the same time interval Δt. Expressed differently, mutually corresponding points 32, 33 and 34, 35, respectively, are characterized in that they have substantially the same coordinates in the plane perpendicular to the z-axis in a coordinate system whose z-axis runs parallel to the axis 27, that is to say these points only differ in the z-value within the scope of measurement and device accuracy. In this case, the axis 27 is defined as a device axis, but the scope of the invention also includes defining this axis as the visual axis of the eye 2 or an axis substantially coinciding with the latter. The time interval Δt largely constant over the cut surfaces 22, 23 here may have values in the seconds range, for example 1 to 10 seconds, for example less than 5 seconds.

FIG. 7b shows the incision in the form of a trajectory 30 as a spiral in exemplary fashion, the latter being formed as a circular spiral in the shown representation for simplification purposes. In the case of an incision from in to out, the radius of the spiral in polar coordinates increases with increasing angle of rotation, in the case of an incision from out to in the radius becomes smaller with increasing angle of rotation. Along the trajectory 30, the cornea 17 is impinged at intervals of a few micrometers with laser pulses having a tissue-separating effect, an area-type tissue separation and hence a cut effect being obtained by stringing together the spiral arms at approximately the same distance.

In reality, this trajectory 30 will not follow a (circular) spiral exactly; by way of example, if the refraction correction should also correct a cylindrical error, the trajectory becomes elliptical as explained, e.g., in DE 10 2006 053 118 by the applicant, the entire content of which is referred to herewith. Should higher-order refractive errors also be corrected, the distances between the spiral arms are also no longer constant in all cases, as explained, e.g., in DE 10 2010 031 348 by the applicant, the entire content of which is likewise referred to. A further option for the incision consists in approximating the spiral by substantially concentric circles, between which transitions from one radius to the next are provided.

Figure 8A:
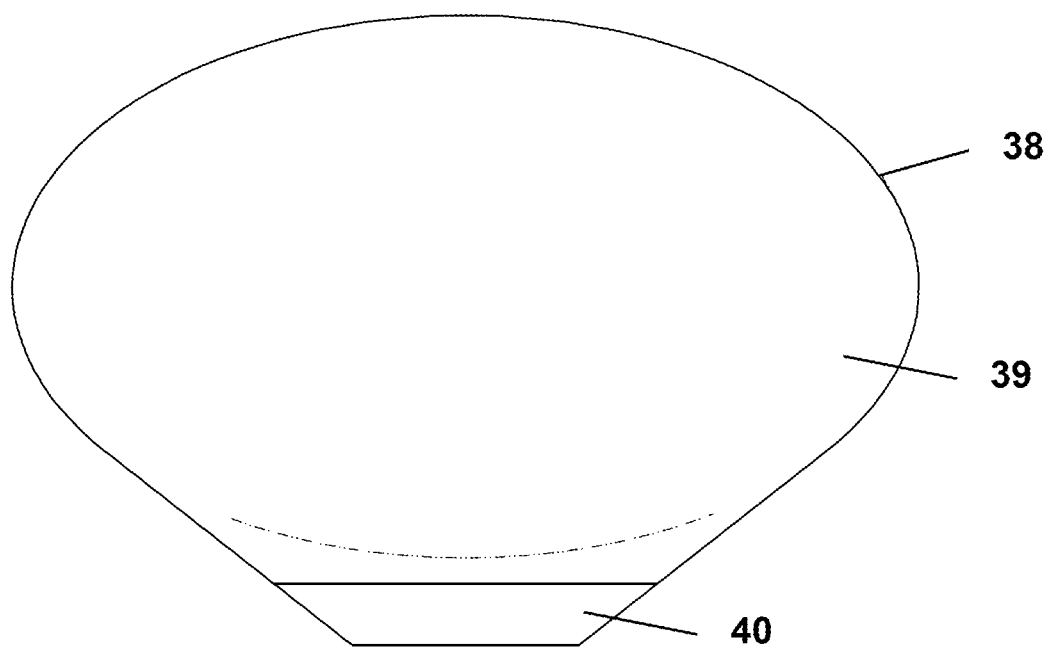
FIG. 8 is a schematic illustration of a scanner mirror according to the invention.
Figure 8B:
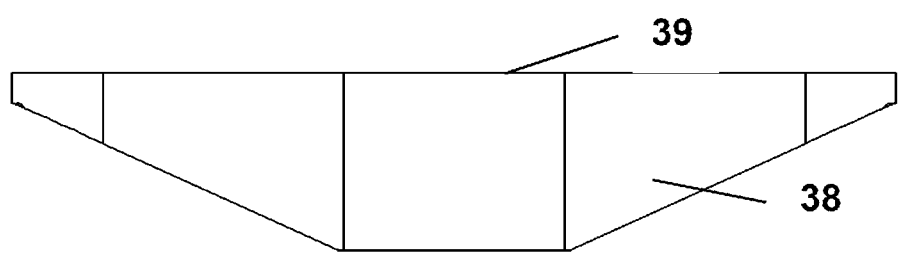

FIG. 8 shows a schematic illustration of a scanner mirror according to the invention, as is contained in the scanners 8a of FIG. 3. Here, FIG. 8a shows a plan view and FIG. 8b shows a cross section of such a scanner mirror. The scanner mirror 38 has a substantially ellipsoid reflection surface 39 and a holding element 40. In this case, the semi-minor axis of the ellipse 39 is matched to the beam diameter of the incident laser beam 6 and the semi-major axis is matched to the laser mirror 38 in maximum deflection during incidence of the laser beam 6. The holding element 40 serves to fasten the scanner mirror at its axis of rotation (not shown here).

It is evident from the cross section of FIG. 8b that the scanner mirror is flattened at the sides in order to save weight, further weight can be saved by way of milled grooves (not shown here) on the back side or cavities in the interior of the mirror 38.

The reflection surface 39 can be produced by polishing the mirror or by applying a reflecting coating.

It is essential to the present invention that the material of the scanner mirror 38 has a high specific stiffness phi, such that the shape and hence the reflection behavior in relation to the beam geometry is maintained even at extremely high deflection frequencies in the kHz range, but, at the same time, the force required to move the scanner mirrors remains manageable.

Figure 9A:
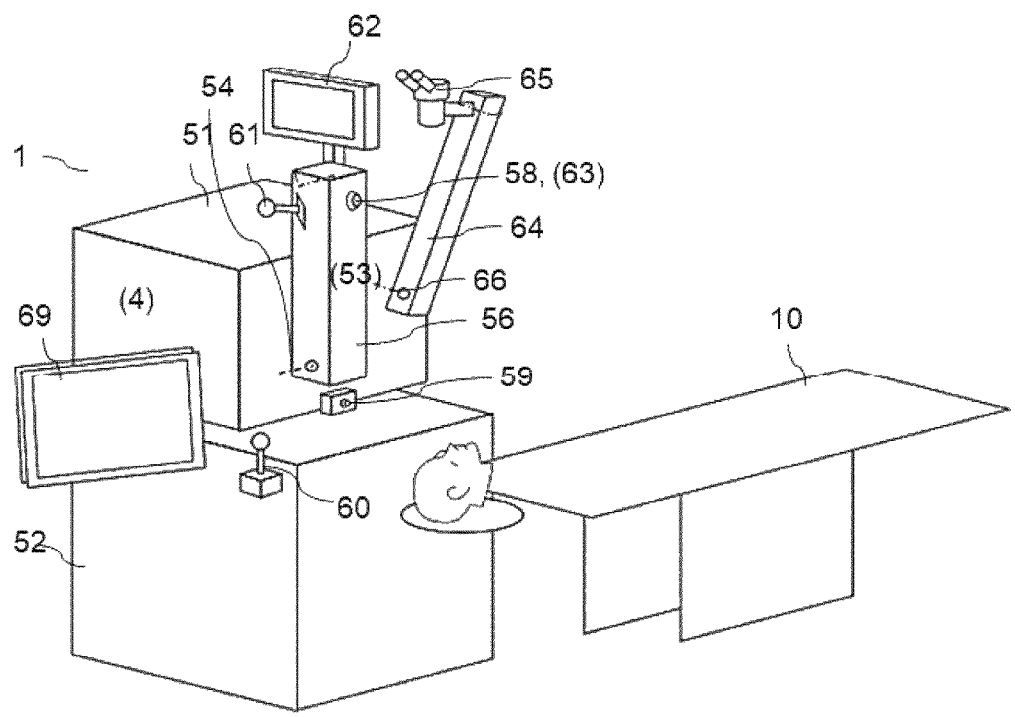
FIG. 9a-c depict an example embodiment of the treatment apparatus.
Figure 9B:
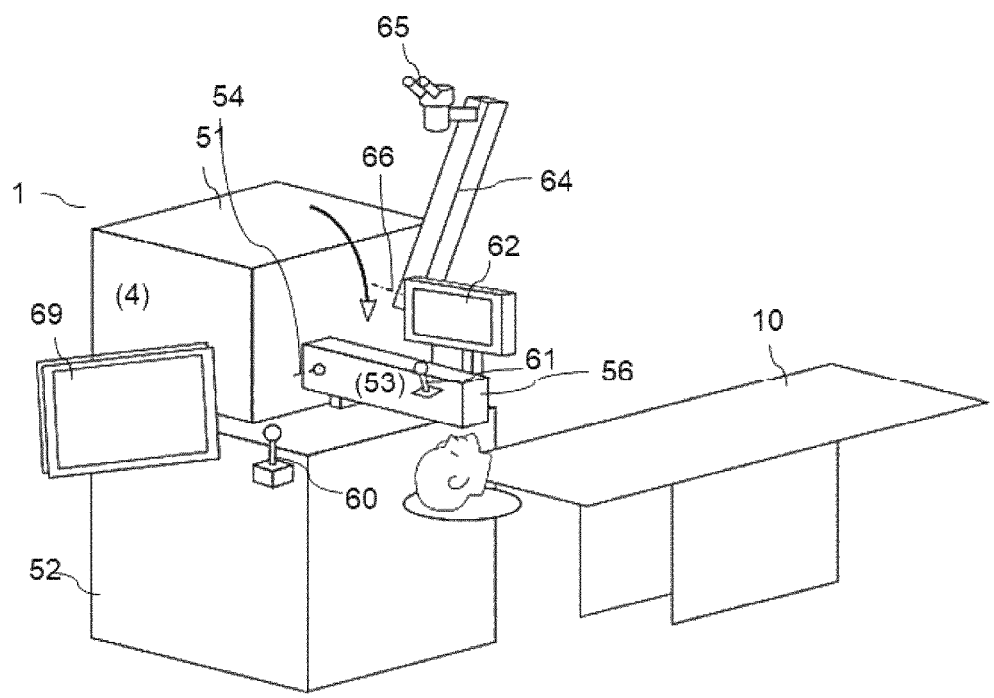
Figure 9C:
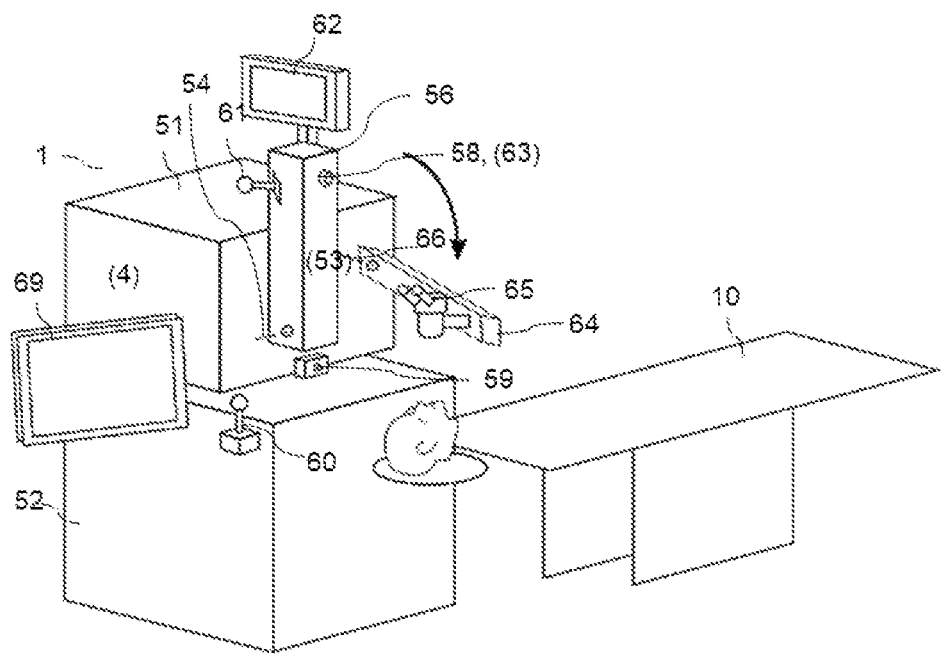

FIGS. 9a to 9c illustrate an example embodiment of the treatment apparatus 1 in more detail.

Here, the treatment apparatus 1 has a laser pivot arm 53 that is enclosed by a pivot arm housing 56 and an additional examination pivot arm 64 with a surgical microscope 65, with the first axis 54 of the laser pivot arm 53 and the second axis 66 of the examination pivot arm 64 on a device head 51 having an appropriate arrangement in relation to one another, and a therapy screen 62 movably fastened to the pivot arm housing 56 is coupled to the movement of the pivot arm housing 56 and also a surgical microscope 65 movably fastened to the examination pivot arm 64 is coupled to the movement of the examination pivot arm 64 in such a way that the therapy screen 62 and also the surgical microscope 65 are always maintained in a non-tilted manner.

A treatment apparatus 1 as shown in this exemplary embodiment can be used very well for a SMILE method, for example, but also for other methods for correcting the visual acuity of an eye or for cataract operations.

Here, FIG. 9a shows a standby mode of this treatment apparatus 1, in which the pivot arms 53, 64 are in a rest position, i.e., "parked" pivoted upward on the device head 51 in a space-saving manner, and in which, for example, a patient can be appropriately placed and positioned on the patient bed 10.

By contrast, FIG. 9b illustrates a laser therapy mode, i.e., the mode in which the laser pivot arm 53 was brought into a work position. By contrast, the examination pivot arm 64 is still in a rest position.

Finally, FIG. 9c shows an examination mode of the exemplary embodiment of the treatment apparatus 1 using a surgical microscope 65. Here, the examination pivot arm 64 has been brought into a work position while the laser pivot arm 53 and its pivot arm housing 56 are in a rest position.

The details should now be specified below.

The exemplary embodiment of the treatment apparatus 1 is composed of a device base 52 and a device head 51 that is adjustable on this device base 52 in terms of the height above a ground plane, i.e., the z-direction, and in terms of its position in the plane, i.e., in the x- and y-directions. The device head 51 contains a first part of the laser therapy optical unit required for performing the laser therapy. In the exemplary embodiment, the device head 51 also contains the laser source, in this case a femtosecond laser source, required to produce a corresponding pulsed laser beam.

The second part of the laser therapy optical unit is rotatably mounted about a horizontal first axis 54 in a laser pivot arm 53. The laser pivot arm 53 can be pivoted about this first axis 54 from a rest position, in which it projects upward in approximately perpendicular fashion, into a work position, in which it is arranged approximately horizontally on the device head 51, i.e., approximately parallel to the ground plane, and back again.

The laser pivot arm 53 with its second laser therapy optical unit and the laser exit aperture 58 is surrounded by a housing, the pivot arm housing 56, in such a way that the pivot arm housing 56 leaves an opening for the laser exit aperture 58. This pivot arm housing 56 is mounted separately to the laser pivot arm 53 in coaxial fashion.

Initially, the pivot arm housing 56 pivots by an angle of approximately 90° together with the laser pivot arm 53 between an approximately perpendicular rest position or standby position and a horizontal work position. The movement is restricted by stops.

Overall, the laser pivot arm 53 can be moved by a greater angle than the pivot arm housing 56. Hence, the laser exit aperture 58, on which a contact glass or a patient interface for coupling the laser pivot arm 53 to the eye of the patient to be treated can be affixed in a detachable manner, can be positioned protruding out of the pivot arm housing 56 to a greater or lesser extent, or else it can be retracted completely into the pivot arm housing 56.

The laser exit aperture 58 is retracted into the pivot arm housing 56, both in the rest position of the laser pivot arm 53 and when pivoting the laser pivot arm 53 and its pivot arm housing 56 from a rest position into a work position and from the work position into a rest position. Hence, the laser pivot arm 53 is in a slightly tilted position in comparison with its pivot arm housing 56.

Once the pivot arm housing 56 has arrived in a work position, i.e., is in the horizontal, the laser pivot arm 53 is released downward and slightly pivoted further such that it, too, reaches an approximately horizontal position and the laser exit aperture 58 emerges from the pivot arm housing 56. Here, the laser pivot arm 53 itself moves smoothly. The treatment apparatus is in the laser therapy mode in the approximately horizontal work position of both pivot arm housing 56 and laser pivot arm 53.

The therapy screen 62 is movably fastened to the pivot arm housing 56. In this case, the therapy screen 62, at the same time, is also the screen of a video microscope 63, showing the view of the laser exit aperture 58 out onto the eye 2 to be treated. The video image of this video microscope 63, which is displayed on the therapy screen 62, is used by the surgeon, for example for the approach to, and the affixment of a contact glass 45 or another patient interface on, the eye 2 to be treated and for the observation of the laser cuts being carried out.

As shown further in FIGS. 9a to 9c, a camera 59 can be used to pre-position the device head 51. Said camera is fastened to the device head 51 and therefore has a fixed spatial relation to the position of the device head 51. The position is selected in such a way that a largely parallax-free view of the work volume of a therapy laser beam is effectuated, in particular of the possible position of its focus as a work point of a therapy objective in the laser therapy optical unit.

A graphic that is overlaid on the image of the camera 59 on the therapy screen 62 and/or else on the planning screen 69 of the planning device 16 already shows in the standby mode, i.e., in the rest position of the laser pivot arm 53, the expected position of the laser pivot arm 53 in its then pivoted-down work position. With the aid of this image, the surgeon can pre-position the device head 51 in such a way that the laser pivot arm 53 after pivoting-down into its work position, i.e., in the laser mode, is in an ideal position for the treatment start in respect of an approximate positioning, and only fine positioning in respect of structures of the eye 2 is still necessary.

Furthermore, a joystick 61 for controlling the coupling process to the patient is attached to the pivot arm housing 56. In the work position, the joystick 61, the laser exit aperture 58 of the laser therapy optical unit and the video image of the eye are aligned along a vertical line in order to facilitate an equally ergonomic operation for right-handed and left-handed users.

Now, a typical course of treatment using an above-described treatment apparatus 1, as can be used, for example, for a SMILE treatment or as part of a SMILE treatment, is described below:

First, the treatment or therapy parameters are planned on a planning screen 69 of the planning device 16, which is likewise arranged directly on the treatment apparatus 1 in this exemplary embodiment. However, alternatively, the planning screen 69 may also be spatially separated from the treatment apparatus 1. When planning, the treatment apparatus 1 is for example in a standby position, that is to say the laser pivot arm 53 and optionally the examination pivot arm 64, too, are pivoted up vertically in the rest position on the system.

The patient is positioned on the patient bed 10. This is possible with some comfort on account of the pivoted-up laser pivot arm 53.

Then, the surgeon positions the height of the device head 51 by use of a joystick 60 on this device head 51, by operation of which the translational movement of the device head 51 over the device base 52 can be controlled. In the process, orientation is provided by the image supplied by the camera 59, said image, including an overlaid symbol of a pivoted-down laser pivot arm 53, being visible on the therapy screen 62 and/or on the planning screen 69. As an alternative to the joystick, the positioning can also be effectuated in other embodiments by inputs on one of the two screens 62, 69 or by way of pushbuttons on the treatment apparatus 1.

The surgeon triggers the motor-driven pivoting-down of the laser pivot arm 53 in, and together with, its pivot arm housing 56; a corresponding pushbutton employed to this end is not shown in the figures. As a result of the prepositioning and the still retracted laser exit aperture 58 of the laser pivot arm, a clear space remains between the laser exit aperture 58 and the patient's eye 2, said clear space expediently having a size of between 50 mm and 150 mm.

Now, a contact glass 45 is placed on the laser exit aperture 58, if this has not yet happened in the rest position of the laser pivot arm 53. The contact glass is held against the laser exit aperture 58 by application of negative pressure. Activation and deactivation of the hold by application of negative pressure is carried out in this case by virtue of pressing the contact glass against the laser exit aperture 58; in the process, the latter is still slightly moved in its retracted position and the switching process is triggered. This is advantageous over previously conventional laser therapy systems: There, the hold of the contact glass is switched separately. Consequently, the contact glass may fall down when it is detached. By contrast, in the solution described here, the surgeon or operator always holds sway over the contact glass during the switching process.

Then, the surgeon initiates the release of the movement of the laser pivot arm 53 within the pivot arm housing 56 by use of a joystick rotation of the joystick 61 on the pivot arm housing 56, or alternatively by use of a separate pushbutton (not shown). An automatic trigger of the movement by way of the applied contact glass is also possible in other embodiments. The laser exit aperture 58 with the contact glass moves toward the eye in the process. Here, the travel is approximately 50 mm, a range for this travel that is very generally expedient is from 30 mm to 100 mm. Hence, a safe distance from the eye, which is approximately 30 mm or, very generally, expediently assumes a value of between 10 mm and 100 mm, still remains.

Finally there is the docking phase, that is to say the phase in which the contact glass 45 is affixed: Here, the surgeon steers the contact glass 45 toward the eye 2 of the patient using the joystick 61 under observation by use—of the video microscope 63. Fixating the eye by suctioning the eye to the contact glass 45 is triggered by a button on the joystick 61 once the correct position has been reached. In one configuration, it is possible to assist the correct positioning or centering of the contact glass or another patient interface on the eye by virtue of processing the video microscope image and using the latter to control the device head 51.

Hence, it is now finally possible by operation of a foot switch, which is not shown here, to start the actual laser therapy step by activating the laser beam, which is guided through the laser therapy optical units and the laser exit aperture 58 and focused in the patient's eye 2.

After completing this laser therapy step, the suctioning of the eye 2 by application of negative pressure is released by virtue of the pressure being increased here again, the laser pivot arm 53, and hence also the laser exit aperture 58, are pivoted back into the pivot arm housing 56 again and the device head 51 is slightly raised by a displacement in the z-direction. Hence, a safe distance from the eye is present once again. If need be, docking could be carried out once again from this position.

However, as a rule, this is not required. The contact glass 45 or the patient interface can be removed from the laser exit aperture 58, with the release being effectuated by brief upward pressure.

Now, the laser pivot arm 53 is pivoted up again together with its pivot arm housing 56; the clear space above the patient is re-established. Now, it is possible to perform further work steps or the patient can leave their position on the patient bed 10. The pivoting-up of the laser pivot arm 53 with its pivot arm housing 56 is initiated electronically, by pushing a button in this case. Alternatively, the laser pivot arm 53 with its pivot arm housing 56 can be pushed manually until this is recognized by a position sensor on the pivot arm housing; following this, a motor takes over the movement.

However, if both eyes of a patient are to be treated, the device head 51 can be moved by a translational movement in the x- and/or y-direction over the device base 52 prior to pivoting-up of the laser pivot arm 53 with its pivot arm housing 56 in its rest position such that the laser pivot arm 53 with its pivot arm housing 56 is positioned over the other eye. A treatment of the second eye can then be effectuated in the same way by virtue of a new contact glass 45 or patient interface being secured on the laser exit aperture 58 by application of negative pressure, and all steps following this are carried out as described above.

Furthermore, an examination pivot arm 64 containing an examination device, in this case a surgical microscope 65, is also fastened in a pivotable manner about a second axis 66 on the device head 51 in this exemplary embodiment of a treatment apparatus 1 according to the invention. By way of example, such a surgical microscope is required, or at least suggested, for the second main work step of the "SMILE" treatment. In the present exemplary embodiment, the surgical microscope 65 contains a camera for recording the video and a slit projector for extended observation options in addition to the necessary illumination.

The pivot axis of the examination pivot arm 64, i.e., the second axis 66, is positioned at a particularly expedient location in space. This allows bringing the surgical microscope 65 on the examination pivot arm 64 from its rest position in which the examination pivot arm 64 is likewise pivoted up—either in a likewise perpendicular position or in an oblique position—to its work position using only one pivot movement.

This work position is also defined by a restriction of the rotational movement of the examination pivot arm 64 by a stop. Here, it has the special property of coinciding with the work position of the laser pivot arm 53 with its second laser therapy optical unit and its laser exit aperture 58 and hence this avoids a change in position of the patient during the treatment.

If such an examination pivot arm 64 with a surgical microscope 65 is present, it is possible to perform the complete SMILE treatment using the treatment apparatus 1. To this end, after pivoting up the laser pivot arm 53 with its pivot arm housing 56 into its rest position after completing the actual laser therapy step, as described here, the treatment is continued as follows:

The surgeon initiates the motor-driven downward pivoting of the examination pivot arm 64 by pressing a button. The motor moves the examination pivot arm 64 into its work position, where it rests on a stop. The work position is determined by expedient selection of the relative position of the two pivot axes, that is to say the first axis 54 and the second axis 66, and the end position of the examination pivot arm 64 that is determined by the stop is determined in such a way that the eye to be treated further lies in the examination volume of the surgical microscope 65 directly after pivoting down the examination pivot arm 64.

Minor corrections, to the extent that these are necessary, are possible by adjusting the position of the device head 51 in relation to the device base 52 by operation of translational movements. Serving to this end is either the joystick 60 present on the device base 52, a separate foot console or a joystick present on the surgical microscope 65.

Once the examination pivot arm 64 with the surgical microscope 65 has been positioned accordingly, the lenticule extraction is carried out by the surgeon.

After completing the lenticule extraction, the examination pivot arm 64 with the surgical microscope 65 is pivoted up in a motor-driven manner and consequently pivoted back into its rest position. This can be initiated by pressing a button or else—as already described above for the pivot arm housing 56 and the laser pivot arm 53—by pushing. Hence, the clear space over the patient is re-established.

It should additionally be observed that the treatment apparatus 1 or the planning device 16 naturally also specifically realizes the performance of the method explained in general terms above.

A further embodiment of the planning device exists in the form of a computer program or a corresponding data medium with a computer program which realizes the planning device on a corresponding computer such that the input of the measurement data is implemented by suitable data transfer operations or structures to the computer and the control data are transferred from this computer to the controller 11, for the purposes of which, once again, data transfer operations or structures known to a person skilled in the art come into question.

While the invention has been presented in detail in the drawings and the description above, the illustration and description should be considered illustrative or exemplary in nature and not restrictive. It is understood that changes and modifications can be undertaken within the scope of the following claims by a person skilled in the art. In particular, the present invention comprises further embodiments with any combination of features of different embodiments described above or below.

The invention claimed is:

1. A planning device for generating control data for a treatment apparatus for eye surgery, said treatment apparatus producing at least one cut surface in a cornea by application of a laser device, the planning device comprising:
   a calculation application configured to define the at least one corneal cut surface at least comprising a lenticule cut and a cap cut; and
   a focal position adjustment mechanism configured to receive specific output values from a control data record to adjust focus of the laser device through three dimensions,
   the calculation application defining the at least one corneal cut surface and generating a control data record that controls the laser device to make the at least one corneal cut surface,
   wherein an incision made by the laser is controlled by application of the control data record transmitted by the planning device so that laser pulses impinge mutually corresponding locations of the lenticule cut and the cap cut at a time interval of up to 10 seconds,
   wherein the mutually corresponding locations of the lenticule cut and the cap cut are x- and y-coordinates in a plane perpendicular to a z-axis in a coordinate system wherein the z-axis extends perpendicular to the plane and through the lenticule cut and the cap cut.

2. The planning device as claimed in claim 1, wherein the control data record is configured so that the incision is controlled so that the lenticule cut and cap cut are cut in the same radial direction.

3. The planning device as claimed in claim 1, wherein the control data record is configured so that the incision is controlled so that the radial cut speed is at least 0.6 mm/s.

4. A treatment apparatus for eye surgery, comprising:
   a laser device which produces at least one corneal cut surface in a cornea by application of laser radiation according to control data; and
   a planning device configured to generate the control data, the planning device determining the at least one corneal cut surface so that the laser device making an incision is controlled so that laser pulses impinge mutually corresponding locations of a lenticule cut and a cap cut at a time interval of up to 10 seconds,
   a focal position adjustment mechanism configured to receive specific output values from a control data record to adjust focus of the later device through three dimensions,
   wherein the mutually corresponding locations of the lenticule cut and the cap cut are x- and y-coordinates in a plane perpendicular to a z-axis in a coordinate system wherein the z-axis extends perpendicular to the plane and through the lenticule cut and the cap cut.

5. The treatment apparatus, as claimed in claim 4, wherein the treatment apparatus has scanners for deflecting the laser radiation, said scanners comprising a material which has a specific stiffness phi of greater than $30 \times 10^6$ $m^2$ $s^{-2}$.

6. The treatment apparatus as claimed in claim 5, wherein the material has the specific stiffness phi of greater than $50 \times 10^6$ $m^2$ $s^{-2}$.

7. The treatment apparatus as claimed in claim 5, wherein the material has the specific stiffness phi of greater than $100 \times 10^6$ $m^2$ $s^{-2}$.

8. The treatment apparatus as claimed in claim 5, wherein the material has the specific stiffness phi of greater than $150 \times 10^6$ $m^2$ $s^{-2}$.

9. A method of generating control data for a treatment apparatus for eye surgery, said treatment apparatus producing at least one cut surface in a cornea by application of a laser device, the method comprising:
   providing corneal data;
   defining the at least one corneal cut surface;
   generating a control data record to make the at least one corneal cut surface that controls the laser device; and
   controlling the laser device to make an incision so that laser pulses impinge mutually corresponding locations of a lenticule cut and a cap cut at a time interval of up to 10 seconds,
   wherein the mutually corresponding locations of the lenticule cut and the cap cut are x- and y-coordinates in a plane perpendicular to a z-axis in a coordinate system wherein the z-axis extends perpendicular to the plane and through the lenticule cut and the cap cut,
   wherein the control data record contains specific output values for a focal position adjustment mechanism to adjust focus of the laser device through three dimensions.

10. The method as claimed in claim 9, further comprising providing the corneal data on a basis of data of a refraction correction.

11. A non-transitory computer program product with program code which, upon execution on a computer, carries out the method as claimed in claim 10.

12. A non-transitory data medium having the non-transitory computer program product as claimed in claim 11.

13. The method as claimed in claim 9, further comprising controlling the laser device so that the lenticule cut and the cap cut are cut in the same radial direction.

14. A non-transitory computer program product with program code which, upon execution on a computer, carries out the method as claimed in claim 13.

15. A non-transitory data medium having the non-transitory computer program product as claimed in claim 14.

16. A non-transitory computer program product with program code which, upon execution on a computer, carries out the method as claimed in claim 9.

17. A non-transitory data medium having the non-transitory computer program product as claimed in claim 16.

18. A method for eye surgery, at least one corneal cut surface being produced in a cornea by application of a treatment apparatus with a laser device, the method comprising:

providing corneal data;

defining the at least one corneal cut surface on a basis of the corneal data;

generating a control data record for the at least one corneal cut surface;

transferring the control data record to the treatment apparatus and producing the at least one corneal cut surface by controlling the laser device using the control data record; and controlling the laser device to make an incision so that laser pulses impinge mutually corresponding locations of a lenticule cut and a cap cut at a time interval of up to 10 seconds, wherein the mutually corresponding locations of the lenticule cut and the cap cut are x- and y-coordinates in a plane perpendicular to a z-axis in a coordinate system wherein the z-axis extends perpendicular to the plane and through the lenticule cut and the cap cut, wherein the control data record contains specific output values for a focal position adjustment mechanism to adjust focus of the laser device through three dimensions.

19. The method as claimed in claim 18, further comprising providing the corneal data on the basis of data of a refraction correction.

20. The method as claimed in claim 18, further comprising defining the at least one corneal cut surface to include a lenticule cut and a cap cut.

* * * * *